(12) United States Patent
Nicholas

(10) Patent No.: US 6,230,315 B1
(45) Date of Patent: *May 8, 2001

(54) DATA PROCESSING METHOD AND APPARATUS

(75) Inventor: Malcolm Nicholas, Oxon (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,190

(22) Filed: Mar. 19, 1998

(30) Foreign Application Priority Data

May 3, 1997 (GB) .................................................. 9709021

(51) Int. Cl.[7] ...................................................... G06F 9/445
(52) U.S. Cl. ......................... 717/5; 717/2; 717/3; 717/4; 717/6; 717/7
(58) Field of Search ...................................... 395/704, 705, 395/706; 717/1, 2, 3, 4, 5, 6, 7, 8

(56) References Cited

U.S. PATENT DOCUMENTS

| 5,499,371 | | 3/1996 | Henninger et al. ................... 395/700 |
| 5,768,564 | * | 6/1998 | Andrews et al. ......................... 717/5 |
| 5,799,193 | * | 8/1998 | Sherman et al. ..................... 395/703 |
| 5,983,020 | * | 11/1999 | Sweeney et al. ......................... 717/5 |
| 6,083,276 | * | 7/2000 | Davidson et al. ....................... 717/1 |

FOREIGN PATENT DOCUMENTS

| 0 709 773 | 1/1996 | (EP) . |
| 0 706 125 | 10/1996 | (EP) . |

OTHER PUBLICATIONS

Woelk et al., "An Object–Oriented Approach to Multimedia Databases", ACM, pp. 311–325, May 1986.*
Buneman et al., "Polymorphism and Type Inference in Database Programming", ACM Transactions, pp. 30–76, Mar. 1996.*
Burge et al., "Recognition and Learning with Polymorphic Structural Components", IEEE, pp. 19–23, 1996.*

* cited by examiner

*Primary Examiner*—Mark R. Powell
*Assistant Examiner*—Ted T. Vo
(74) *Attorney, Agent, or Firm*—Wayne L. Ellenbogen; Anne Vachon Dougherty

(57) ABSTRACT

Described is a method and apparatus for transforming computer data from a first form to a second form, by representing the first form of the computer data by an object model having a plurality of objects, providing a plurality of transformational agents each for transforming an object into a portion of the second form, and linking the transformational agents to produce a transformational agent model to transform the object model into the second form of the computer data.

15 Claims, 3 Drawing Sheets

50 MASS STORAGE

200 DD SYSTEM

210 REPOSITORY

MODEL 220

OBJECT 230

APPLET 240

250 TAM

260 TA

270 TOOL-KIT

FIG. 2

DATA PROCESSING METHOD AND APPARATUS

TECHNICAL FIELD

The present invention relates in general to a data processing method and apparatus and in particular to a data processing method and apparatus for transforming computer recognizable information from one form to another.

BACKGROUND OF THE INVENTION problem of transforming such information can be regarded as having two planes. The first plane concerns the transformation of information types. The second plane concerns the meaning of the information before and after transformation.

For example, consider the specific problem of transforming an object model into computer programming language source code. The first plane of the problem concerns transformation of objects within the object model, such as transformation of class objects in an implementation object model into an ordered collection of characters or "textual stream". The second plane of the problem, in the case of a class object, concerns the information actually extracted from the class object (eg name, super-class etc.) and how such information is represented in the textual stream (eg. by position).

Conventionally, the problem of transforming an object model into source code has been solved using a "code generator" in the form of a static computer program. If the inputs to a static program change, or if a different output is required, the program must be re-written. There is consequently a general reluctance to upgrade conventional code generators in order to handle new programming technologies. Furthermore, any increase in the diversity of application of a code generator based on conventional static programming techniques requires a corresponding increase in the size of the code generating code which, in turn makes the code generator harder to maintain.

In a conventional object-oriented programming language such as Smalltalk, there are class definitions to define objects. Messaging allows such objects to collaborate with each other. The Smalltalk Virtual Machine allows such objects to be created and to execute their behavior. However, when a Smalltalk run-time program is delivered, it is a static program. In other words, a Smalltalk run-time program cannot be adapted to take account of changes in either inputs or outputs. Furthermore, the behaviour of objects therein cannot be changed. An example of a conventional method for automatic generation of object-oriented code for mapping relational data to objects is described in U.S. Pat. No. 5,499,371.

SUMMARY OF THE INVENTION

In accordance with the present invention, the aforementioned problems associated with conventional code generators are alleviated by employing a collection of persistent objects which cooperate to perform the transformation. These persistent objects are known as transformation agents and the collaborations between such agents form a transformational agent model.

In a preferred embodiment of the present invention, there is provided a method for transforming computer data from a first form to a second form, the method comprising: representing the first form of the computer data by an object model having a plurality of objects; providing a plurality of transformational agents each for transforming an object into a portion of the second form; and linking the transformational agents to produce a transformational agent model; and, transforming the object model into the second form based on the transformational agent model.

Viewing the present invention from another aspect, there is now provided apparatus for transforming computer data from a first form to a second form, the apparatus comprising: means for representing the first form of the computer data by an object model having a plurality of objects; means for providing a plurality of transformational agents each for transforming an object into a portion of the second form; and means for linking the transformational agents to produce a transformational agent model; and, means for transforming the object model into the second form based on the transformational agent model.

Viewing the present invention from yet another aspect, there is now provided a computer program product for transforming computer data from a first form to a second form, the product comprising: means for representing the first form of the computer data by an object model having a plurality of objects; means for providing a plurality of transformational agents each for transforming an object into a portion of the second form; and means for linking the transformational agents to produce a transformational agent model; and, means for transforming the object model into the second form based on the transformational agent model.

Returning to the aforementioned first problem plane, in a preferred example of a code generator embodying the present invention, there are provided transformational agents having a behaviour for turning objects into streams. For example, the transformation of the class object Address into a textual stream providing a simple definition of the class object may be as follows:

{ClassObject}Address T>{TextualStream} "Object subclass: Address"

where {} indicates object instances of a class and T> is the transformational operator.

Moving to the aforementioned second problem plane, the agent responsible for the above example transformation requests the superclass from the class object, {ClassObject}Object in the above example, and the name of the class object, {TextualStream}"Address". The agent also knows the format of the stream: superclass name followed by the textual stream "subclass", followed by the name of the class object.

What follows is a brief general description of a preferred example of a transformational agent model.

A Transformational agent model comprises a set of ordered collaborations defining transformational behaviour between transformational agents. In a preferred example of a transformational agent model, each agent understands the behaviour required to perform a specific transformation. The transformational behaviour definition for the agents is polymorphic. Thus, the model as a whole is polymorphic.

The number of different sets of transformational behaviour the model and the agents therein can understand is effectively unlimited. This guarantees to any agent of a transformational agent model that any other agent within the same model will understand any of the sets of transformational behaviour that the agent itself understands. Thus, there is an implicit description in an agent of all the transformational behaviour it may expect from other agents within the same model. However, each agent of the model does not have to perform the transformational behaviour in the same manner.

Each agent of the model, when requested to perform the transformational behaviour, returns a result that is understood by the requester of the behaviour. An agent's transformational behaviour is defined polymorphically. Thus, the result of the transformational behaviour is also polymorphic. Any parameter in the request to perform the behaviour is thus also polymorphic. Every agent of the model has a common understanding of the possible values of each of any parameters in the transformational behaviour request and the result of the behaviour.

In some embodiments of the present invention, the behaviour, parameters, and results definition corresponding to the transformational agent model, and the agents therein, may be non-polymorphic in nature.

In practice, one of the transformational agents in the model is defined as the start point from which the transformation begins. The agent defined as the start point is the agent which first executes its transformational behaviour.

BRIEF DESCRIPTION OF DRAWINGS

Preferred embodiments of the present invention will now be described, by way of example only, with reference to the accompanying drawings, in which:

FIG. 2 is a block diagram of an example of a code generator embodying the present invention; and, FIG. 3 is a flow diagram of the code generating system of FIG. 2 in operation.

DETAILED DESCRIPTION OF THE PREFERRED EMBODIMENTS

Figure 1:
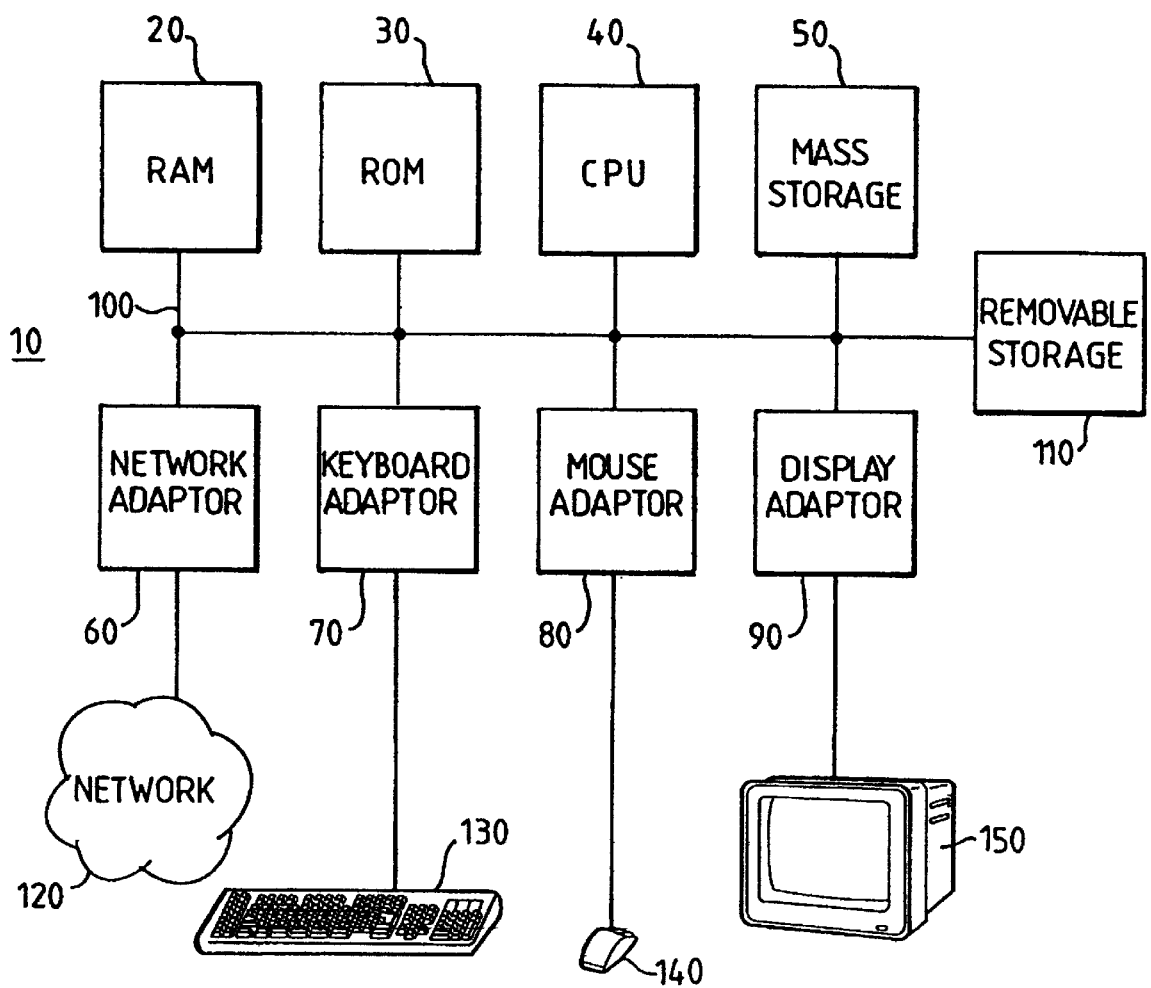
FIG. 1 is a block diagram of a computer system.

Referring first to FIG. 1, a computer system 10 comprises a system random access memory (RAM) 20, a system read only memory (ROM) 30, a central processing unit 40, a mass storage device 50 comprising one or more large capacity magnetic disks or similar data recording media, one or more removable storage means 110 such as floppy disk drives, CD ROM drives and the like, a network adaptor 60, a keyboard adaptor 70, a pointing device adaptor 80, and a display adaptor 90, all interconnected via a bus architecture 100. A keyboard 130 is coupled to the bus architecture 110 via the keyboard adaptor 70. Similarly, a pointing device 140, such as a mouse, touch screen, tablet, tracker ball or the like, is coupled to the bus architecture 100 via the pointing device adaptor 80. Equally, a display output device, such as a cathode ray tube (CRT) display, liquid crystal display (LCD) panel, or the like, is coupled to the bus architecture via the display adaptor 90. Additionally, the computer system may be coupled to a computer network 120 via the network adaptor 60.

Basic input output system (BIOS) software is stored in the ROM 30 for enabling data communications between the CPU 40, mass storage 50, RAM 20, ROM 30, removable storage, and adaptors 60, 70, 80 and 90 via the bus architecture 100. Stored on the mass storage device 50 are operating system software and application software packages such as word-processors, internet browsers, spreadsheets, and computer-aided design (CAD) tools. Further application software packages may be loaded into the computer system 10 via the removable storage 110 or the network 120. In operation, the operating system software enables the computer system 10 to select and run each of the application software packages. The application software packages include an object technology system having a code generator embodying the present invention.

As hereinbefore described, the problem of code generation can be divided into two planes: the transformation of types; and, the meaning of information. In accordance with the present invention, the code generating transformation is performed by a transformational agent model comprising transformational agents working cooperatively with each other to produce the transformation as defined by the model.

Referring now to FIG. 2, the code generating object technology system 200 is based on Smalltalk. The system 200 has a repository 210 for a plurality of different models 220 and objects 230, including analysis and design objects. The models 220 and objects 230 within them are referred to as artifacts. The system also includes a plurality of applets 240 for creating, defining, and manipulating the artifacts, and for object modelling. The system 200 also comprises tool-kit software 270 for generating a graphic user interface (GUI) on the display screen 150 of the computer system 10 through which a user can interact with the applets 240.

The repository 210 of the system 200 additionally includes applets 240 for creating, updating and storing transformational agent models (TAMs) 250 and the transformational agents (TAs) 260 therein.

Figure 3:
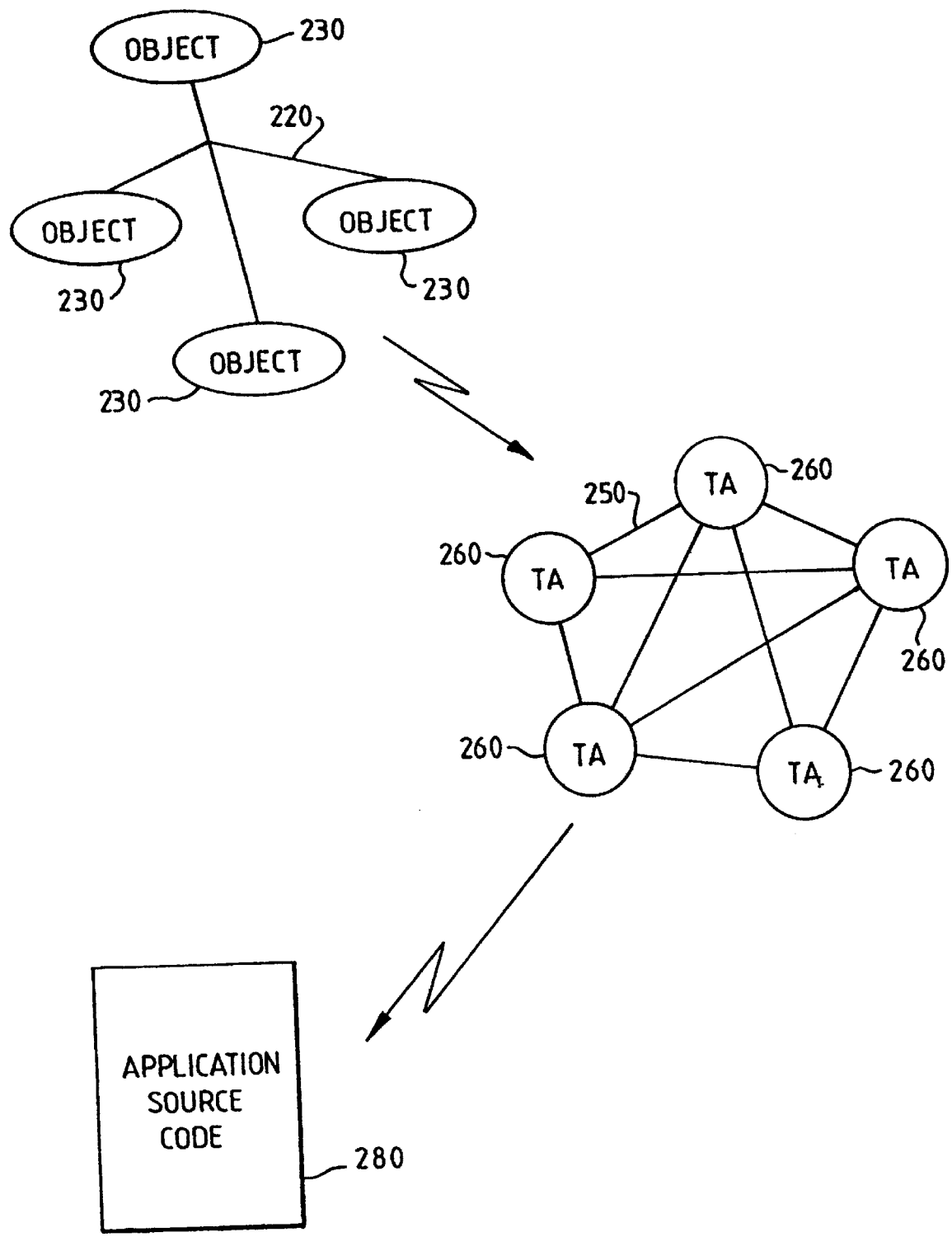

Referring to FIG. 3, in operation, the agents 260 of the transformational agent model 250 convert the objects 230 of an object model 220 into application source code 280.

What follows now is a brief description of an example applet transformational agent model 250 included in the repository.

Each transformational agent 260 has two attributes. The first attribute is the context within which the agent 260 is to generate code. The second attribute is the template the agent 260 is to use for code generation. The context is the source of the information and may be one or more objects 230. In the example provided above, the context is {(ClassObject)Address. The template is a textual stream defining the transformation on the second problem plane. In the example provided above, the template is:

{TextualStream}"<superclass name>subclass:#<name>"

Performing the transformation defined in the template is referred to as resolving the template.

The definition of the execution model of a transformational agent 260 is based upon the attributes of the agent 260. Specifically, the execution model of a transformational agent 260 is:

Step 1: Generate any code required before resolving the template for the context.

Step 2: Resolve the template for the context.

Step 3: Generate any code required having resolved the template for the context.

Steps 1 and 3 in the execution model of the transformational agent 260 correspond to the collaborations of the transformational agent 260 with other transformational agents 260 in the transformational agent model 250. Thus, steps 1 and 3 provide the definition of the transformational agent model 250. When an agent 260 collaborates with another agent 260, it passes the context to the agent 260 with which it is collaborating.

Each transformational agent 260 thus has two collaborative relationships. The first relationship is with pre-template resolution transformational agents 260 hereinafter referred to as pre-template agents 260, and the second relationship is with post-template resolution transformational agents 260 hereinafter referred to as post-template agents 260. The relationships between pre-template and post-template agents 260 are ordered because transformational agent models 250 are built from ordered collaborations between agents 260.

This enables highly versatile transformational agent models 250 to be built. Indeed most code generation can be accomplished sequentially using only post-template agents 260. However, the present invention is not limited in application to the problem of performing transformations in code generation and may, instead, be applied to the problem of performing transformations in general. Therefore, in particularly preferred systems embodying the present invention, the artifact definition is not restricted to transformation for code generation alone. Because, in such systems, the context within which the agent 260 is working may be more than object, three further attributes are included, as follows:

- Header —a textual stream placed on the resultant textual stream without any interpretation or transformation, before the agent performs step 1 of the execution model.
- Footer —a textual stream placed on the resultant textual stream without any interpretation or transformation, after the agent performs step 3 of the execution model.
- Template gap —a textual stream placed on the resultant textual stream without any interpretation or transformation, after the agent performs step 2 for each of the objects 230 in context, with the exception of the last agent in the context (this is analogous to the gaps in telegraph poles).

It may be desirable, in some circumstances, to change the context of a transformational agent 260. For example, when transforming a class artifact into a Smalltalk definition, instance variables may be included in the definition. Such instance variables may be other artifacts. Thus, the context may be changed from the class artifact to the instance variable artifact.

To accommodate such changes in the context, the transformational agents 260 in preferred embodiments of the present invention are provided with two further attributes; namely a context relationship accessor and a context selector. The context selector defines the behaviour of the context that is used to change the context. The result of executing this behaviour in the context provides the new context for the agent 260. The context relationship accessor defines a relationship type to the context. The objects 230 related to the context via the relationship type becomes the new context.

If neither the context relationship accessor nor the context selector are specified for the agent then the context is not changed. If either the context relationship accessor or the context selector are specified then the context is changed to the result of either mechanism. If both the context relationship accessor and the context selector are changed, then the context relationship accessor takes precedence over the context selector in determining the new context.

Note that when the context of an agent 260 is changed, it is changed for just the agent 260 and not for the whole model 250.

The execution model of transformational agents 260 in preferred embodiments of the present invention is therefore as follows:

Step 1: Determine the context.
Step 2: Resolve the header.
Step 3: Perform the collaborations with the pre-template agents 260.
Step 4: Resolve the template for each object 230 in the context.
  Step 4.1: If there is more than one object 230 in the context and the current object 230 is not the last object 230 in the context collection, resolve the template gap, and
Step 5: Perform the collaborations with the post-template agents 260.
Step 6: Resolve the footer.
Step 7: Return the result.

Returning to FIG. 2, to extend the system 200 to accommodate transformational agent artifacts in the repository 210, a SystemClass artifact is created, followed by a corresponding Smalltalk class. The Smalltalk class is created because the system run-time environment is a Smalltalk run-time program. Thus, to create instances of objects 230, a class definition is required. The Smalltalk class definition does not hold all the information about the type of an artifact required by the system 200. For example, collaborative relationships and thus the SystemClass artifact describing the artifact are also added.

To solve the aforementioned first problem plane, the Smalltalk class is given the behaviour to create textual streams and to add the header, the footer, the template gap, and the resolved template. The second problem plane is encapsulated in the resolution of the template. Behaviour is added to the Smalltalk class to interpret the template.

As indicated earlier, the template is a textual stream. Thus, the final step of resolving the template is to add the result of the resolution, which must be a textual stream, onto the textual stream resulting from the transformation.

Before this is performed however, the template is scanned for text bracketed by <>. Such bracketed text is referred to as a resolution clause. A resolution clause contains a plurality of messages the result of which replaces the resolution clause in the template. In general, a message is a question or a request send to an object 230. In this case, the object 23 is the context of the transformational agent 260. The first message in the resolution clause is sent to the context of the transformational agent 260 and subsequent messages are sent to the result of the previous message. These messages are unary (they have no parameters) for the purposes of the templates of agents 260 in a code generation transformational agent model 250, and the receiver of the message must understand the message. Otherwise, the system 200 raises an error.

This enables information to be extracted from the source, ie: from the context. Returning to the example quoted earlier, the template is:

{TextualStream}"<superclass name>subclass:<name>"

The first resolution clause of this template is <superclass name>. The context is {SystemClassArtifact}Address. The message "superclass" is sent first to the context. This will result in {SystemClassArtifact}object.

{SystemClassArtifact}Object is then sent the message "name" and {TextualStream}Object is returned. The template then becomes:

{TextualStream} "Object subclass:<name>"

The process is then repeated for <name>and the final template becomes:

{TextualStream} "Object subclass: Address"

In the preferred embodiments of the present invention hereinbefore described , there is provided an object technology system 200 having: a repository; means 240 for enabling creation of transformational agents 250 and transformational agent models 260; means 210 for storing the agents 250 and models 260 in the repository; and, a Smalltalk class having a behaviour for resolving the aforementioned first and second problem planes.

To summarise, in a particularly preferred embodiment of the present invention, there is provided a code generator applet comprising a transformational agent model 250 implemented by a collection of system artifacts which are transformational agents 260 with definable transformational behaviour via attributes and collaborations with other agents.

As mentioned earlier, the repository 210 of the system 200 contains artifacts. In particularly preferred embodiments of the present invention, the repository 210 also has version control and configuration management. Thus, each transformational agent 260 can have many different versions, with different templates etc. The transformational agent model 250 therefore has a configuration, a configuration being a specification of all transformational agents 260 required for a transformational agent model 250 and the version required for each agent 260. It will be appreciated that there can be more than one configuration for a transformational agent model 250 and that each different configuration can have versions.

For example, a transformational agent model 250 for a Smalltalk code generator (hereinafter referred to as Smalltalk Generator) may have, say, two generators:

{TransformationalAgent}Smalltalk Definition Generator and {TransformationalAgent}Accessor Methods Generator.

The configuration for Smalltalk Generator may be:

{Configuration}Smalltalk Generator VERSION 1.0 {TransformationalAgent}Smalltalk Definition Generator VERSION 10 {TransformationalAgent}Accessor Methods Generator VERSION 2.0

This means that, because the transformation agent model 250 hereinbefore described is an application for code generation, the application can be versioned. In other words, the application code (eg: the system and Smalltalk class for the transformational agent) does not have to be rewritten when a change in function of the code generator is desired. Instead, when a change of function is desired, the agents 260 in the model 250 can be updated and a new version of the configuration for the code generator can be created both via the tool-kit of the system.

What is claimed is:

1. A method in a computer for transforming selected computer data which is stored at least temporarily at said computer from a first form to a second form, the method comprising:

representing the first form of the selected computer data by an object model having a plurality of objects;

providing a plurality of transformational agents each comprising executable code for transforming an object into a portion of the second form; and linking the transformational agents to produce a transformational agent model; and, transforming the object model into the second form by executing the code for the plurality of transformation agents in a sequence which is based on the transformational agent model, and wherein each of the transformational agents has two attributes comprising the context and the template, the method further comprising each of the transformational agents performing an execution model comprising the steps of:

generating first code required for resolving the template for the context;

resolving the template for the context; and generating second code required for having resolved the template for the context.

2. A method as claimed in claim 1, wherein the linking step comprises providing a set of ordered collaborations defining transformational behaviour between transformational agents.

3. A method as claimed in claim 2, wherein the transformational behaviour definition is polymorphic.

4. The method of claim 1 wherein the steps of generating first and second code comprise collaborating with other transformational agents in the transformational agent model.

5. The method of claim 1 wherein each of the transformational agents operates on more than one of the plurality of objects of the context and further comprising the steps of:

creating a header stream prior to the generating of first code;

creating a footer stream after the generating of second code; and creating a template gap after resolving the template for each of the more than one of the plurality of objects of the context.

6. The method of claim 4 further comprising changing the context of at least one of the plurality of transformational agents.

7. The method of claim 6 wherein each of the transformational agents further comprises at least one of a context relationship accessor and a context selector for changing the context.

8. The method of claim 5 wherein resolving the template comprises the steps of:

determining the context;

resolving the header;

performing collaborations with a first of said other transformational agents;

resolving the template for each object in the context;

performing collaborations with a second of said other transformational agents;

resolving the footer; and returning a result.

9. Apparatus for transforming computer data from a first form to a second form, the apparatus comprising:

means for representing the first form of the computer data by an object model having a plurality of objects; and means for providing a plurality of transformational agents each comprising executable code for transforming an object into a portion of the second form and means for linking the transformational agents to produce a transformational agent model; and means for transforming the object model into the second form based on the transformational agent model, wherein each of said transformational agents has two attributes comprising the context and the template, and comprises means for generating first code required for resolving the template for the context; means for resolving the template for the context; and means for generating second code required for having resolved the template for the context.

10. Apparatus as claimed in claim 9, wherein the linking means comprises providing a set of ordered collaborations defining transformational behaviour between transformational agents.

11. Apparatus as claimed in claim 10, wherein the transformational behaviour definition is polymorphic.

12. Apparatus as claimed in claim 9, wherein each transformational agent comprises a context attribute and a template attribute.

13. Apparatus as claimed in claim 12, wherein the template attribute comprises a textual stream.

14. Apparatus as claimed in claim 12, wherein the transformational agent further comprises a header attribute, a footer attribute, and a template gap.

15. A computer program product for transforming computer data from a first form to a second form, the product comprising:

means for representing the first form of the computer data by an object model having a plurality of objects;

means for providing a plurality of transformational agents each comprising executable code for transforming an object into a portion of the second form;

means for linking the transformational agents to produce a transformational agent model; and means for transforming the object model into the second form based on the transformational agent model, wherein each of said transformational agents has two attributes comprising the context and the template, and comprises means for generating first code required for resolving the template for the context; means for resolving the template for the context; and means, for generating second code required for having resolved the template for the context.

* * * * *